US008867836B2

(12) United States Patent
Warfield et al.

(10) Patent No.: US 8,867,836 B2
(45) Date of Patent: Oct. 21, 2014

(54) IMAGE REGISTRATION METHODS AND APPARATUS USING RANDOM PROJECTIONS (75) Inventors: Simon Warfield, Brookline, MA (US); Ayelet Akselrod-Ballin, Kiryat Ono (IL)

(73) Assignee: Children's Medical Center Corporation, Boston, MA (US)

( * ) Notice: Subject to any disclaimer, the term of this patent is extended or adjusted under 35 U.S.C. 154(b) by 317 days.

(21) Appl. No.: 13/393,578

(22) PCT Filed: Sep. 1, 2010

(86) PCT No.: PCT/US2010/002390
§ 371 (c)(1),
(2), (4) Date: Oct. 16, 2012

(87) PCT Pub. No.: WO2011/028273
PCT Pub. Date: Mar. 10, 2011

(65) Prior Publication Data
US 2013/0028516 A1    Jan. 31, 2013

Related U.S. Application Data

(60) Provisional application No. 61/277,007, filed on Sep. 18, 2009, provisional application No. 61/238,942, filed on Sep. 1, 2009.

(51) Int. Cl.
*G06K 9/36* (2006.01)
*G06T 7/00* (2006.01)
*G06T 1/00* (2006.01)
*G06T 7/20* (2006.01)

(52) U.S. Cl.
CPC ............. *G06T 7/2013* (2013.01); *G06T 7/0026* (2013.01); *G06T 1/00* (2013.01)
USPC ........... 382/173; 382/128; 382/131; 382/154; 382/190; 382/257

(58) Field of Classification Search
USPC ......... 382/128, 131, 132, 133, 145, 146, 147, 382/148, 149, 154, 173, 190, 257, 294, 282, 382/284; 703/14; 324/307; 345/428; 600/419
See application file for complete search history.

(56) References Cited

U.S. PATENT DOCUMENTS

| 5,926,190 A | 7/1999 | Turkowski et al. |
| 2004/0135577 A1* | 7/2004 | Yatsui et al. .................. 324/307 |

(Continued)

FOREIGN PATENT DOCUMENTS

EP    2006805 A9    7/2009

OTHER PUBLICATIONS

International Search Report and Written Opinion for International Application No. PCT/US2010/002390 mailed Apr. 26, 2011.

(Continued)

*Primary Examiner* — Ali Bayat
(74) *Attorney, Agent, or Firm* — Wolf, Greenfield & Sacks, P.C.

(57) ABSTRACT

According to some aspects, a computer-implemented method of registering a first image and a second image is provided. The method comprises computer-implemented acts of logically dividing the first image into a first plurality of regions, logically dividing the second image into a second plurality of regions, projecting the first plurality of regions and the second plurality of regions into a lower dimensional space using random projections, determining, for each of the projected first plurality of regions, at least one of the projected second plurality of regions that is closest according to first criteria, and determining a transform that brings each of the projected first plurality of regions into a closest correspondence with the respective at least one of the projected second plurality of regions according to second criteria, the transform indicating the registration of the first image and the second image. According to some aspects, at least one computer readable medium encoding instructions that when executed perform such a method and/or a system for providing such a method is provided.

20 Claims, 6 Drawing Sheets

(56) References Cited

U.S. PATENT DOCUMENTS

2007/0185946 A1        8/2007    Basri et al.
2011/0157183 A1*       6/2011    Kaule et al. .................. 345/428
2012/0033862 A1*       2/2012    Wang et al. .................. 382/128
2013/0051685 A1*       2/2013    Shechtman et al. .......... 382/218

OTHER PUBLICATIONS

Johnson, W., Lindenstrauss, J., "Extensions of lipschitz mapping into a Hilbert space," Contemp. Math. 26 (1984), pp. 189-206.

Achlioptas, D., "Database-friendly random projections: johnson-lindenstrauss with binary coins," Journal of Comp. and Sys. Sci. 66 (2003), pp. 671-687.

Liberty, E., Ailon, N., Singer, A., "Dense fast random projections and lean walsh transforms," Lect. In Com. Sci. (2008), pp. 512-522.

Indyk, P., Motwani, R., "Approximate nearest neighbors: towards removing the curse of dimensionality," In STOC98 (1998), pp. 604-613.

Andoni, A., Indyk, P., "e2lsh: Exact Euclidean locality-sensitive hashing," Implementation available at http://web.mit.edu/andoni/www/LSH/index.html (2004).

* cited by examiner

IMAGE REGISTRATION METHODS AND APPARATUS USING RANDOM PROJECTIONS

CROSS-REFERENCE TO RELATED APPLICATION

This application is a National Stage under 35 U.S.C. § 371 of PCT international application PCT/US2010/02390, entitled "IMAGE REGISTRATION METHODS AND APPARATUS USING RANDOM PROJECTIONS," filed on Sep. 1, 2010, which claims priority to U.S. Provisional Application Ser. No. 61/277,007, entitled "IMAGE REGISTRATION METHODS AND APPARATUS USING RANDOM PROJECTIONS," filed on Sep. 18, 2009, and U.S. Provisional Application Ser. No. 61/238,942, entitled "ACCELERATING FEATURE BASED REGISTRATION USING THE JOHNSON-LINDENSTRAUSS LEMMA," filed on Sep. 1, 2009, each of which are hereby incorporated by reference in their entirety.

BACKGROUND

Image registration is a process employed in a variety of applications that require or benefit from establishing spatial correspondences between images. For example, registration algorithms may be used in medical imaging applications to align image data taken from a patient at different points in time, using different imaging parameters and/or to align adjacent slices in a three dimensional (3D) image data set. Image registration may also be used to correct for motion between successive sections during MRI or CT scans, for example, or to align images from different subjects for comparison in medical research such as fMRI studies. Various nonmedical applications may also benefit from the use of image registration to integrate data taken at different times or from different perspectives, for example in computer vision, remote sensing, and astrophotography.

Image registration systems typically designate one image as the reference image to which a second target image is to be aligned. The alignment may be carried out by attempting to match the intensity patterns of the entire target image to those of the reference image, or by identifying particular features within the two images that should correspond with one another. In feature-based registration, a feature of interest may be first identified, either manually or automatically, in both the reference and target images and then further processed to register or align the features. Alternatively, each image may be divided into patches roughly the size of the features being used for alignment. Patches of the target image may then be compared to the patches of the reference image in a search for correspondences between the two images.

Once one or more correspondences between the target and reference images have been determined, the image registration system may compute a transform that will bring those correspondences into alignment. Depending upon the application in which the image registration is performed, alignment of target and reference images may require rigid, affine, or non-rigid transforms. The use of non-rigid transforms may be particularly effective in medical imaging applications, in which deformation of the subject is common due to breathing, anatomical changes, etc. Microscopy applications, for example, may require registration techniques that can successfully align images in the face of rotation and shearing of tissue samples in a liquid medium, as well as potential tearing, folding, artifacts, etc.

Image registration may be particularly useful in applications such as neural imaging, in which image structures are complex and numerous, and deformation is intrinsic to at least some of the methods of image acquisition. However, the search for correspondences in image data of such complexity can be computationally costly. On the other hand, efforts to reduce the computational complexity involved in image registration often produces unsatisfactory results with respect to accuracy and/or robustness of the registration.

OVERVIEW

Some embodiments include a computer-implemented method of registering a first image and a second image, the method comprising computer-implemented acts of logically dividing the first image into a first plurality of regions, logically dividing the second image into a second plurality of regions, projecting the first plurality of regions and the second plurality of regions into a lower dimensional space using random projections, determining, for each of the projected first plurality of regions, at least one of the projected second plurality of regions that is closest according to first criteria, and determining a transform that brings each of the projected first plurality of regions into a closest correspondence with the respective at least one of the projected second plurality of regions according to second criteria, the transform indicating the registration of the first image and the second image.

Some embodiments include at least one computer readable medium encoded with instructions that, when executed by at least one processor, perform a method of registering a first image and a second image, the method comprising logically dividing the first image into a first plurality of regions, logically dividing the second image into a second plurality of regions, projecting the first plurality of regions and the second plurality of regions into a lower dimensional space using random projections, determining, for each of the projected first plurality of regions, at least one of the projected second plurality of regions that is closest according to first criteria, and determining a transform that brings each of the projected first plurality of regions into a closest correspondence with the respective at least one of the projected second plurality of regions according to a second criteria, the transform indicating the registration of the first image and the second image.

Some embodiments include a system for registering a first image and a second image, the system comprising an input to receive the first image and the second image, and at least one processor coupled to the input, the at least one processor programmed to perform a method comprising logically dividing the first image into a first plurality of regions, logically dividing the second image into a second plurality of regions, projecting the first plurality of regions and the second plurality of regions into a lower dimensional space using random projections, determining, for each of the projected first plurality of regions, at least one of the projected second plurality of regions that is closest according to first criteria, and determining a transform that brings each of the projected first plurality of regions into a closest correspondence with the respective at least one of the projected second plurality of regions according to second criteria, the transform indicating the registration of the first image and the second image.

DETAILED DESCRIPTION

Many of today's imaging applications utilize large sets of high-resolution images which require alignment through image registration. As the size of the typical data set becomes larger, the computations involved in conventional registration processes quickly become very costly. Typically, the most computationally expensive operation in the registration process is the search for feature correspondences between the target image and the reference image. In the conventional naïve search, the target and reference images are divided into a number of smaller regions, or patches, which are used in pairwise comparison to locate feature correspondences. Each patch in the target image is compared with each patch in the reference image through the computation of a similarity measure over all of the data points, or pixels, in the patch.

If the patch size is chosen such that there are d pixels in each patch, and if the image size is such that there are n patches in each image, then the complexity of the search time per patch query is $O(nd)$. That is, the step of comparing a single patch in the target image to a single patch in the reference image requires $O(d)$ operations to compute the similarity measure over all of the pixels in each patch, and then this step is repeated over all n of the patches in the reference image. Comparing each of n patches in the target image to each of n patches in the reference image thus requires $O(n^2 d)$ operations. Given a database containing T images to be registered, the overall complexity of naïve correspondence search in image registration is $O(Tn^2 d)$. Considering the relatively high-resolution images often used in various medical imaging applications, when the n patches cover the entire or substantially the entire image, a brute-force comparison of all target patches with all reference patches may become computationally prohibitive.

Some existing registration algorithms have approached the problem of correspondence search complexity by employing truncated search strategies in order to achieve smaller computation times (i.e., by reducing the size of n in the complexity estimation). Such algorithms may restrict the correspondence search to a smaller region of the image, or may resample the image prior to search in order to decrease the number of pixel operations. Other techniques may assume a certain type of movement between the target image and the reference image to limit the neighborhood of the image to decrease the search space for correspondences. Truncated search methods such as these may entail significant losses in registration accuracy, as feature correspondences may be overlooked in the restricted search. Initialization accuracy may also have a large effect on the results of such truncated search methods, leading to decreased robustness of the algorithm.

Various aspects of the present invention derive from Applicant's appreciation that the search for correspondences in feature-based image registration may be dramatically accelerated, while at the same time preserving robustness and accuracy of alignment, by utilizing Johnson-Lindenstrauss (JL) dimension reduction. For example, Applicant has developed various image registration methods that comprise projection of intact target and reference image regions into a lower dimensional space prior to feature correspondence search, and in particular, Applicant has developed various methods for reducing the computational complexity of image registration through random projections by performing the search in the reduced dimensional space resulting from the random projections.

In some embodiments according to the present invention, random projections may be used to project the set of patches from the target and reference images into a lower dimensional space. For example, original patches in d-dimensional space may be projected into a lower k-dimensional space, such that similarity measures may be computed over k pixels/projected patch rather than d pixels/original patch. Applicant has recognized that such random projections may be constructed such that accuracy and robustness of the resulting image alignment may be guaranteed by the Lemma of Johnson & Lindenstrauss (Johnson, W., Lindenstrauss, J.: Extensions of lipschitz mapping into a Hilbert space. Contemp. Math. 26 (1984) 189-206), which is herein incorporated by reference in its entirety.

According to the JL Lemma, any set of n points in d-dimensional Euclidean space can be projected down into k-dimensional Euclidean space, where $k=O(\epsilon^{-2} \log n)$ is independent of d, while maintaining pairwise distances with a low distortion (expanding or contracting all pairwise distances by a factor of at most $1+\epsilon$). Thus, Applicant has identified and appreciated that JL dimension reduction of image patches using random projections allows feature correspondence relationships to be preserved nearly as in the original images, when $k=O(\log n)$.

Projection of each of the d-dimensional image patches into k-dimensional space allows each pairwise patch similarity measure to be computed over only k pixels. The computational complexity of feature correspondence search in registering a database of images may thus be reduced as low as $O(Tn^2 k)=O(Tn^2 \log n)$. In comparison with the conventional naive correspondence search requiring $O(Tn^2d)$ operations, utilization of random projections to lower dimensional space in accordance with embodiments of the present invention may incur computational savings of $O(d-k)$ operations.

In addition, Applicant has appreciated that dimensional reduction of image patches using random projections may permit even further reductions in computation costs through incorporation of efficient lower dimensional correspondence search strategies. In some embodiments, brute-force pairwise computations of similarity measures between all projected patches may be replaced by accelerated search techniques such as approximate nearest neighbor (ANN) formulations. Incorporation of such accelerated lower dimensional correspondence search strategies in accordance with embodiments of the present invention may incur significant additional computational savings, as described below.

Applicant has also developed various transform estimation methods for computing image registrations from detected feature correspondences with enhanced accuracy. In some embodiments according to the present invention, normalized correlation (NC) measures for projected image patch matches may be incorporated within an expectation maximization iterative closest point (EM-ICP) framework in order to estimate the most likely transform between a target image and a reference image. The resulting EM-ICP-NC technique, iterating over patches rather than points, can achieve more accurate image registration transforms than conventional estimation methods.

Applicant has appreciated that image registration methods using random projections may also be further expanded to incorporate robustness to varying degrees of rotation, inversion, shearing, tearing, etc., between images to be brought into alignment. In some embodiments according to the present invention, patches extracted from the target image may be rotated by multiple angles prior to performing dimensional reduction and correspondence search with these different starting conditions. The rotations with greatest similarity to patches in the reference image may then be selected as likely feature correspondences. The computed transform between the target and reference image patches can thus account for continuous or piecewise rotations of common structures represented in the images.

Following below are more detailed descriptions of various concepts related to, and embodiments of, methods and apparatus according to the present invention. It should be appreciated that various aspects of the invention described herein may be implemented in any of numerous ways. Examples of specific implementations are provided herein for illustrative purposes only. In addition, the various aspects of the invention described in the embodiments below may be used alone or in any combination, and are not limited to the combinations explicitly described herein.

Figure 1:
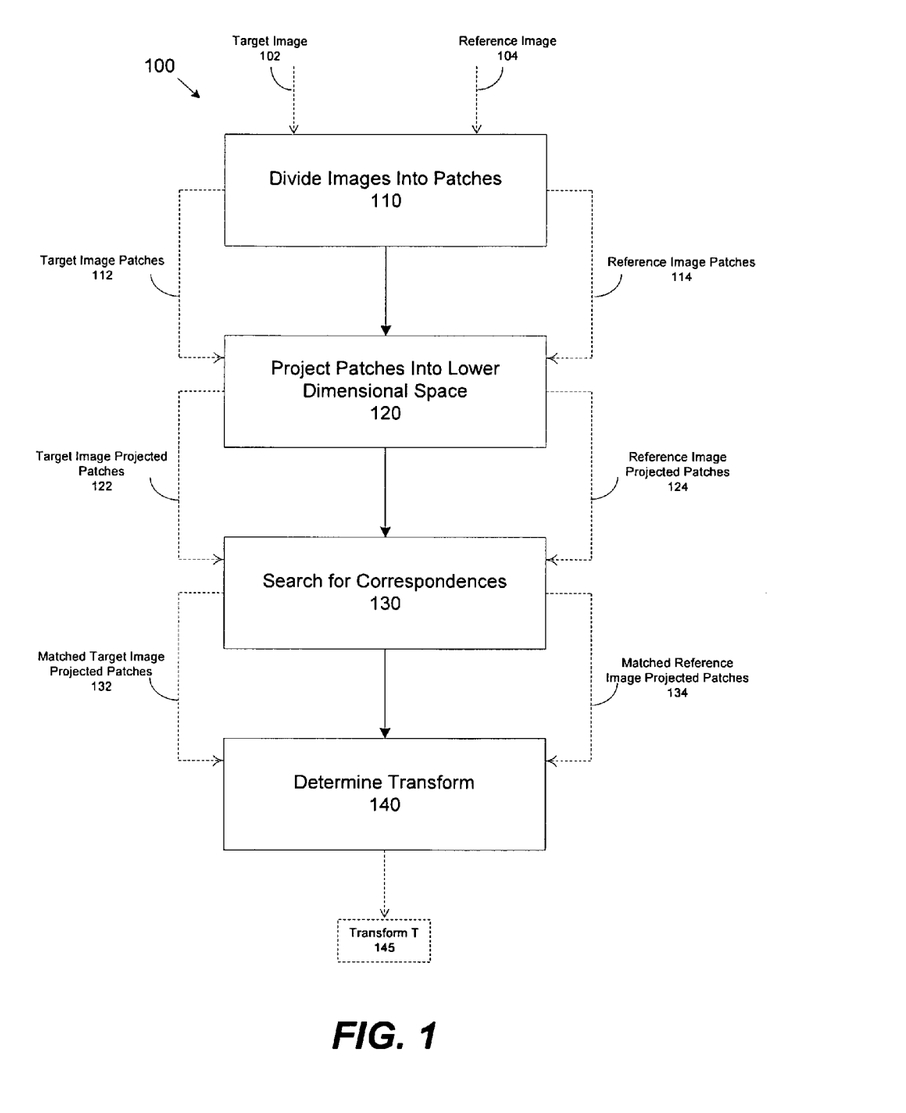

FIG. 1 is a flow chart illustrating a method of performing image registration, in accordance with some embodiments of the present invention. Method 100 may be used, for example, in connection with a target image 102 and a reference image 104 that are desired to be aligned for use in an imaging application. Method 100 may be applied in connection with, or embedded in a system for, any application requiring or benefiting from the alignment of two or more images representing common scenes, objects, structures, or the like. As discussed above, these may include, but are not limited to, medical imaging applications, computer vision applications, remote sensing applications, etc. Target image 102 and reference image 104 may be part of any data-set obtained from any imaging source including, but not limited to, electron microscopy (EM), x-ray computed tomography (CT) data, magnetic resonance (MR) data, single photon emission computed tomography (SPECT), positron emission tomography (PET), computed radiography (CR), etc.

Target image 102 and reference image 104 may each comprise any data structure encoding a visual representation of any scene. The image data may be of any size consistent with the memory capacities of any media on which they may be stored, and may represent objects, structures, scenes, or the like at any scale appropriate for the application in which they may be used. The image data may encode visual information in any number of dimensions such as 2D or 3D scans from, for example, any one or combination of data sources listed above, or higher-dimensional images as in video representations or the like having a temporal component. The image data may have been obtained using any type of image acquisition device and may be recorded on any type of data storage medium. At their input to method 100, the image data may have been supplied directly by any image acquisition device(s), obtained from any database(s) on which image data are stored, read from any media and/or transmitted from a local or remote source (e.g., over a network).

Target image 102 and reference image 104 may be single images or may be members of a set of any number of images that are desired to be aligned with each other. Reference image 104 may be any image selected according to any number of criteria to be a reference against which target image 102 is to be compared, transformed, and aligned. In successive invocations of method 100, a single image in a set may be retained as the reference image 104 to which all other images in the set will be aligned as target images 102, or different images may be selected to perform the function of the reference image 104 for different target images 102. In some embodiments according to the present invention, all target images in a set may be aligned to a single reference image, selected as the middle image of the set. In other embodiments, a reference image may be selected as the first or last image of a set, or may be selected according to any number of other criteria appropriate to the application (e.g., the reference image may be an adjacent image slice in a 3D data set for each successive target image in the data set).

Target image 102 may be any image that is desired to be spatially aligned to reference image 104. Target image 102 may represent one or more objects, structures, scenes, or the like in common with reference image 104, or may be desired to be aligned to reference image 104 for any other reason appropriate to the application. The subject matter of target image 102 may be translated, rotated, scaled, sheared, or otherwise spatially distorted in comparison with the corresponding subject matter of reference image 104. Target image 102 and reference image 104 may represent common subject matter at different points in time, subject matter having some degree of spatial offset between locations in space, or subject matter from different objects that may share some commonality, for example. Despite the possible spatial distortions between the two images, target image 102 and reference image 104 may contain one or more corresponding structures, herein referred to as features, that may be matched through the acts of method 100 (e.g., by matching image patches in the images), or any combination of various other embodiments described herein, in order to bring the two images into alignment according to some suitable measure/criteria.

As discussed above, a goal of feature-based image registration is to determine a best alignment between two images by identifying features in the target image that correspond with features in the reference image. A search for feature correspondences may be conducted by comparing regions in the two images that are roughly the size of the features to be detected. Such regions, smaller in size than the total size of any image being registered, are herein referred to as patches. It should be appreciated that the values in a patch need not represent the raw intensity information of the image but may represent any information obtained or processed from the image. For example, the patches may represent gradient information (e.g., the magnitude of the spatial derivative), local texture information and/or other higher order information computed/derived from the image. Indeed, the patches may contain any information derived from the image, as the aspects of the invention are not limited in this respect. Accordingly, in some embodiments, target image 102 and reference image 104 may each be divided into a plurality of patches in act 110 to prepare for feature correspondence detection.

In act 110, target image 102 and reference image 104 may be divided into a plurality of patches; the size of a single patch may be selected to include d pixels. The value of d may be chosen according to any number of criteria appropriate to the application, the computational specifications of the registration system, and/or the nature of the features to be detected in correspondence. In some embodiments according to the present invention, the patch size d may be selected based on a characteristic dimension of a feature of interest. Appropriate values of d may be provided by expert knowledge on the subject matter of the imaging application, by experience with or inspection of the types of images to be registered, or through various types of trial-and-error procedures, for example.

In some embodiments according to the present invention, target image 102 and reference image 104 may be divided in act 110 into an equal number of patches of consistent size d, such that each image is divided into n patches of size d. In other embodiments, different values of d may be selected for patches in different images, or for different patches within the same image. The entire area of each image may be divided into patches, or patches may be extracted only from certain regions of the images, selected according to any number of criteria. Patch selection criteria may incorporate knowledge about the relative utility of certain regions and/or features in the registration process, and/or may involve some degree of computational savings through restriction of the number of patches to search. However, such restricted search is not required in order to achieve significant computational benefits through various methods described herein in accordance with the present invention. That is, some embodiments include searching over the entirety of the image.

Patch extraction 110 may result in a set of d-dimensional target image patches 112 and a set of d-dimensional reference image patches 114. In act 120, each of these patches may be reduced in size prior to feature correspondence search through random projection into a lower dimensional space. As discussed above, each original patch of size d may be projected to a smaller size k, such that later computation of similarity measures will require only k operations per projected patch pair, rather than the more computationally complex d operations per original patch pair. As discussed in more detail below in reference to FIG. 2, any random projection scheme may be used, as the aspects of the invention are not limited in this respect. In some embodiments, the random projection scheme satisfies the JL Lemma, thereby preserving accurate feature correspondences with low distortion for k≥O(log n).

Dimensional reduction performed in act 120 may result in a set of k-dimensional target image projected patches 122 and a set of k-dimensional reference image projected patches 124. In act 130, the target image projected patches 122 may be compared with the reference image projected patches 124 in a search for best correspondences. The search may be performed in any number of ways that consider one or more values or measures indicative of the similarity between pairs of patches in matching each target image projected patch with at least one closest, or most similar, reference image projected patch. Some examples of appropriate search strategies in accordance with embodiments of the present invention are described in further detail below in reference to FIG. 3.

The results of correspondence search in act 130 are a set of matched target image projected patches $t_i$ 132 and a set of matched reference image projected patches $r_i$ 134. The sets may be ordered such that, for each integer value of i, patch $t_i$ is matched to patch $r_i$, and the ordered set of matched patch pairs maximizes the total similarity measure over all of the patches. In act 140, the matches between target image projected patches and reference image projected patches may be used in the determination of a transform T 145 that, when applied to the set of projected patches of the target image, brings them into alignment with the matched projected patches of the reference image according to a selected measure/criteria. The transform determination may be made in any number of ways, some examples of which are described in further detail below in reference to FIGS. 3 and 4, that result in transform T indicating the computed registration of the target image and the reference image.

Figure 2:
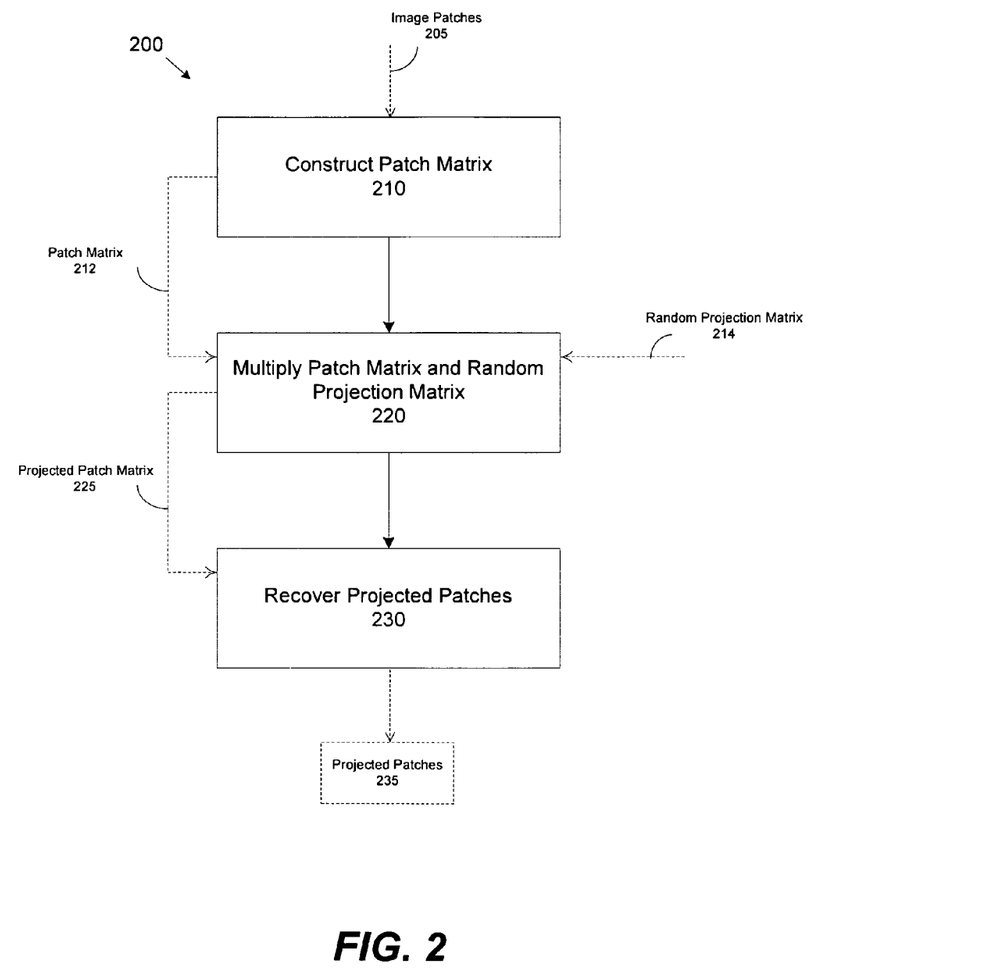

FIG. 2 is a flow chart illustrating in greater detail a method of projecting image patches into a lower dimensional space, in accordance with some embodiments of the present invention. Method 200 may be used, for example, in connection with a set of image patches 205 which may, in some embodiments, comprise the set of target image patches 112 or the set of reference image patches 114 extracted in act 110. Given the set of image patches of original size d pixels/patch, method 200 may be invoked in order to reduce the dimensionality of each of the patches prior to performing a correspondence search, such that similarity measures may be computed over the smaller space of k pixels/projected patch, in accordance with some embodiments of the present invention.

As discussed above, Applicant has recognized that d-dimensional image patches may be projected down into k-dimensional space using random projections that may preserve accurate feature correspondences between target and reference images. The projection used may be any random projection, for example, a random projection scheme that allows for a set of n patches in d-dimensional Euclidean space to be projected into k-dimensional Euclidean space. In some embodiments, the random projection scheme satisfies the JL Lemma such that $k=O(\epsilon^{-2} \log n)$ is independent of d, while maintaining pairwise distances with distortion of at most $1+\epsilon$. However, any suitable random projection scheme that lower the dimensionality of the search space may be used, as the aspects of the invention are not limited in this respect.

Examples of suitable random projection methods include, but are not limited to, the methods described in Achlioptas (Achlioptas, D.: Database-friendly random projections: johnson-lindenstrauss with binary coins. Journal of Comp. and Sys. Sci. 66 (2003) 671-687) (hereinafter "Achlioptas") and Liberty et al (Liberty, E., Ailon, N., Singer, A.: Dense fast random projections and lean walsh transforms. Lect. In Com. Sci. (2008) 512-522) (hereinafter "Liberty"), both of which are herein incorporated by reference in their entireties.

In preparation for projection into a lower k-dimensional space, data representing image patches 205 may be arranged into a patch matrix, as shown in act 210. In some embodiments according to the present invention, patch matrix 212 may be constructed as an n×d matrix, in which each of n d-dimensional patches from a particular image is represented by a row of pixel intensity data. In act 220, patch matrix 212 may be multiplied by a random projection matrix 214. In some embodiments, projection matrix 214 may be a dense random matrix that projects elements of patch matrix 212 onto a spherically random hyperplane through the origin. In other embodiments, projection matrix 214 may be constructed as a d×k random ±1 projection matrix whose elements are all either 1, 0 or −1. In some embodiments, such a random ±1 projection matrix may be constructed with matrix entries $R(i,j)=r_{ij}$, where the random variables $r_{ij}$ are: {1 with probability 0.5, and −1 with probability 0.5}. In other embodiments, the $r_{i,j}$ may be: {$\sqrt{3}$ with probability ⅙, 0 with probability ⅔, and $-\sqrt{3}$ with probability ⅙}, or may use any other suitable probability distribution. In some implementations, the use of such random ±1 projection matrices may allow the projection matrix to be generated using very simple probability distributions, and may allow the projection of the patch matrix to be computed using only addition and subtraction operations (no multiplications). Also, the use of a random ±1 projection matrix with some zero elements may decrease computation time, as only operations involving nonzero elements need be considered. Further details with respect to the above described projection matrices are discussed in Achlioptas incorporated above.

Projected patch matrix 225 may be an n×k matrix resulting from the application of random projection matrix 214 to patch matrix 212. In accordance with some embodiments, each row of projected patch matrix 225 corresponds to the projection of one of the n original d-dimensional image patches into k-dimensional space. These projected patches 235 may be extracted in act 230 by separating the rows of projected patch matrix 225. In some embodiments, the set of projected patches 235 may comprise the target image projected patches 122 or the reference image projected patches 124 to be used in a feature correspondence search in act 130.

In accordance with some embodiments, projection of each d-dimensional patch into k-dimensional space through naïve matrix multiplication may be computed with O(dk) operations. In other embodiments, any of a number of more efficient projection strategies may be utilized to reduce the computational complexity of projection from dimension d to dimension k to as few as O(d) operations, further details of which are discussed in Liberty incorporated above. For example, in some embodiments, projection matrix 214 may be constructed by composing a lean Walsh matrix with a random sign diagonal matrix (e.g., a diagonal matrix with diagonal elements that are 1 with probability 0.5, and −1 with probability 0.5). A lean Walsh matrix, as described by Liberty, is a recursive tensor product matrix initialized by a constant seed matrix, and can be applied to any vector in O(d) operations. The seed matrix may be a rectangular matrix with fewer rows than columns, whose elements each have an absolute value equal to the inverse of the square root of the number of rows, and whose rows are orthogonal. The lean Walsh matrix may be constructed recursively using Kronecker products, such that the lean Walsh matrix of order l is formed by the Kronecker product of the seed matrix with the lean Walsh matrix of order l−1. In other embodiments, projection matrix 214 may be constructed by composing a lean Walsh matrix with another suitable Johnson Lindenstrauss matrix construction.

In some embodiments, the projection dimension k may be selected to be any appropriate value smaller than d and as small as O(log n). When satisfying the JL lemma, such projections may preserve Euclidean distances between the n patches with bounds on distortion. However, other random projections may be used, as the aspects of the invention are not limited in this respect.

Figure 3:
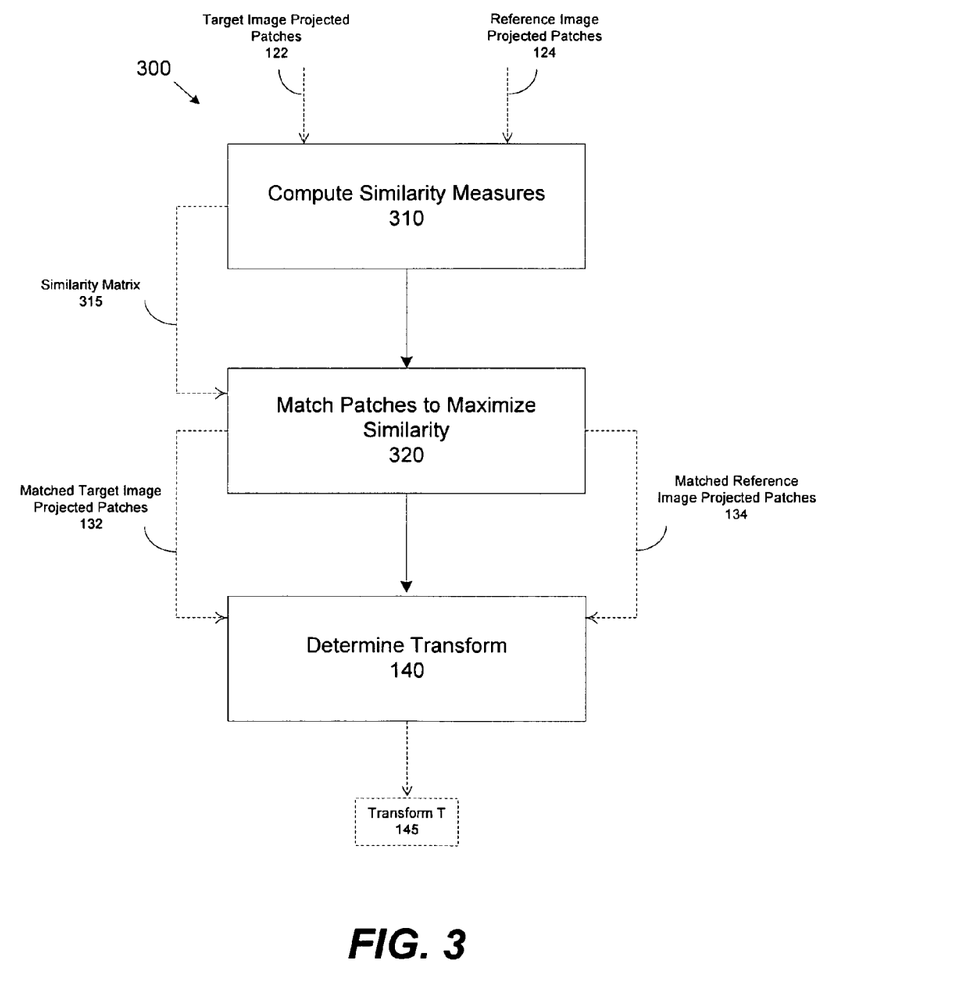

FIG. 3 is a flow chart illustrating a method of searching for feature correspondences between images, in accordance with some embodiments of the present invention. Method 300 may be used, for example, in connection with the target image projected patches 122 and the reference image projected patches 124 resulting from the projection into lower dimensional space of the target image patches 112 and the reference image patches 114, respectively, as performed in act 120. Method 300 may be performed in order to determine the best matches according to certain similarity metric(s) between the target image projected patches 122 and the reference image projected patches 124, which are to be brought into alignment with each other according to a particular measure/criteria, as discussed in further detail below.

In some embodiments, one or more similarity measures may be computed between the target image projected patches 122 and the reference image projected patches 124 in act 310. For a single target image projected patch and a single reference image projected patch, the similarity measure provides an indication of how close the two patches are in correspondence with one another. The similarity metric(s) used may be any number of values or measures indicative of the similarity between pairs of patches, including, but not limited to, Euclidean distances, correlation ratios, normalized cross-correlations, etc. In some embodiments, the set of patches may be normalized to zero mean and unit magnitude, and the Euclidean distance between pairs of normalized patches may then be computed as an equivalent of the normalized correlation (NC).

The result of computation of similarity measures in act 310 is a similarity matrix 315, which may list the computed similarity measure for each pairing of a target image projected patch and a reference image projected patch. In some embodiments, a brute-force approach may entail the computation of similarity measures for all pairwise comparisons between all target image projected patches and all reference image projected patches. It should be appreciated that the reduced dimensionality search space renders a comparison between each target image projected patch with every reference image projected patch computationally feasible. However, such an exhaustive comparison is not required and other comparison schemes may be used, as the aspects of the invention are not limited in this respect. The entire matrix of similarity measures may be retained for use in later stages of the method, or a smaller subset may be retained, for example the K nearest matches for each target image projected patch, for any selected value of K.

In act 320, each target image projected patch may be matched to a reference image projected patch in such a way as to maximize the total similarity measure computed over all of the patch matches. The results may be a set of matched target image projected patches $t_i$ 132 and a set of matched reference image projected patches $r_i$ 134, which may be used in subsequent transform determination in act 140. The sets may be ordered such that, for each integer value of i, patch $t_i$ is matched to patch $r_i$, and the ordered set of matched patch pairs maximizes the total similarity measure for those patches. The matched patch pairs represent detected feature correspondences between the target image and the reference image to be registered.

In other embodiments, brute-force approaches to the search for feature correspondences may be replaced by any number of accelerated search strategies such as approximate nearest neighbor (ANN) formulations, for example. In the ANN formulation, given a query point q and a specified constant c, algorithms return not the nearest point p to q, but instead a point whose distance from q is at most a factor of c larger than the distance of p from q. This approach results in efficient algorithms based on data structures such as tree based search strategies (e.g., k-d trees, spill trees) and locality sensitive hashing (LSH). Examples of suitable lower dimensional search strategies include, but are not limited to, those described in Indyk & Motwani (Indyk, P., Motwani, R.: Approximate nearest neighbors: towards removing the curse of dimensionality. In STOC98 (1998) 604-613) and Andoni & Indyk (Andoni, A., Indyk, P.: $e^2$lsh: Exact Euclidean locality-sensitive hashing. Implementation available at http://web.mit.edu/andoni/www/LSH/index.html (2004)), both of which are herein incorporated by reference in their entireties. Incorporation of efficient strategies for lower dimensional feature correspondence search may reduce the number of search patches per query patch, producing significant savings in computational costs in addition to those gained through patch projection into lower dimensional space.

In some embodiments, the search for feature correspondences may be conducted by addressing the R-near neighbor problem. Solving the R-near neighbor problem may involve finding, for each target image projected patch, any reference image projected patch whose similarity to the target image projected patch by an appropriate similarity measure is greater than or equal to R, for some suitable value of R (or, equivalently, whose dissimilarity or distance from the target image projected patch is less than or equal to R). In some embodiments, the R-near neighbor problem may be efficiently solved by first preprocessing the reference image projected patches to associate each reference image projected patch with a point in a space relevant to the similarity measure being used (e.g., a pixel intensity space), and to determine an area of points in that space within a distance of R from that point (e.g., points whose dissimilarity from the reference image projected patch would evaluate to R or less). The area of points within a similarity distance of R may be stored in a hash table for each reference image projected patch. When finding a matching reference image projected patch for a target image projected patch, the target image projected patch may be associated with a point in the relevant space, and the hash table may be searched for a reference image projected patch with that point stored as being within distance R from it.

In other embodiments, the search for feature correspondences may be conducted by addressing a randomized version of the R-near neighbor problem, involving finding, for a target image projected patch, a reference image projected patch whose distance from the target image projected patch is less than or equal to R, with a suitable guaranteed minimum probability. In still other embodiments, an approximate version of the R-near neighbor problem may be addressed, such that any reference image projected patch whose distance from the target image projected patch is at most cR may be found, if there exists a reference image projected patch whose distance is at most R from the target image projected patch, with a constant probability. Such near neighbor problems may be solved in some embodiments using techniques such as locality sensitive hashing (LSH).

A hash function is a mathematical function that, when applied to various inputs (e.g., reference image projected patches), will map two or more different inputs to the same hash value. A locality sensitive hash function is one for which the probability of two input points (e.g., two image patches) being mapped to the same output hash value (i.e., "colliding") decreases with the distance between the two input points. In some embodiments, a locality sensitive hash function may be applied to the set of projected patches of the reference image in preprocessing, and the resulting hash values may be stored in a hash table in association with the corresponding reference image projected patches. When finding a matching reference image projected patch for a target image projected patch, the hash of the target image projected patch may be computed, and only the reference image projected patches with which the target image projected patch collides may be considered. In some embodiments, computational efficiency may be further improved by applying a number of different locality sensitive hash functions.

In act 140, the matches between target image projected patches and reference image projected patches may be used in the determination of a transform T 145 that, when applied to the set of projected patches of the target image, brings them into alignment with the matched projected patches of the reference image according to a desired closeness measure/criteria. The transform may be constrained to any number of rigid, affine, or non-rigid transform types, depending on the expected relationships between the images undergoing registration. Depending on the application, transform types may be selected to accommodate any of a number of possible spatial distortions between the target and reference images including, but not limited to, translation, rotation, scaling, shearing, inversion, tearing, folding, insertion of artifacts, etc.

Figure 4:
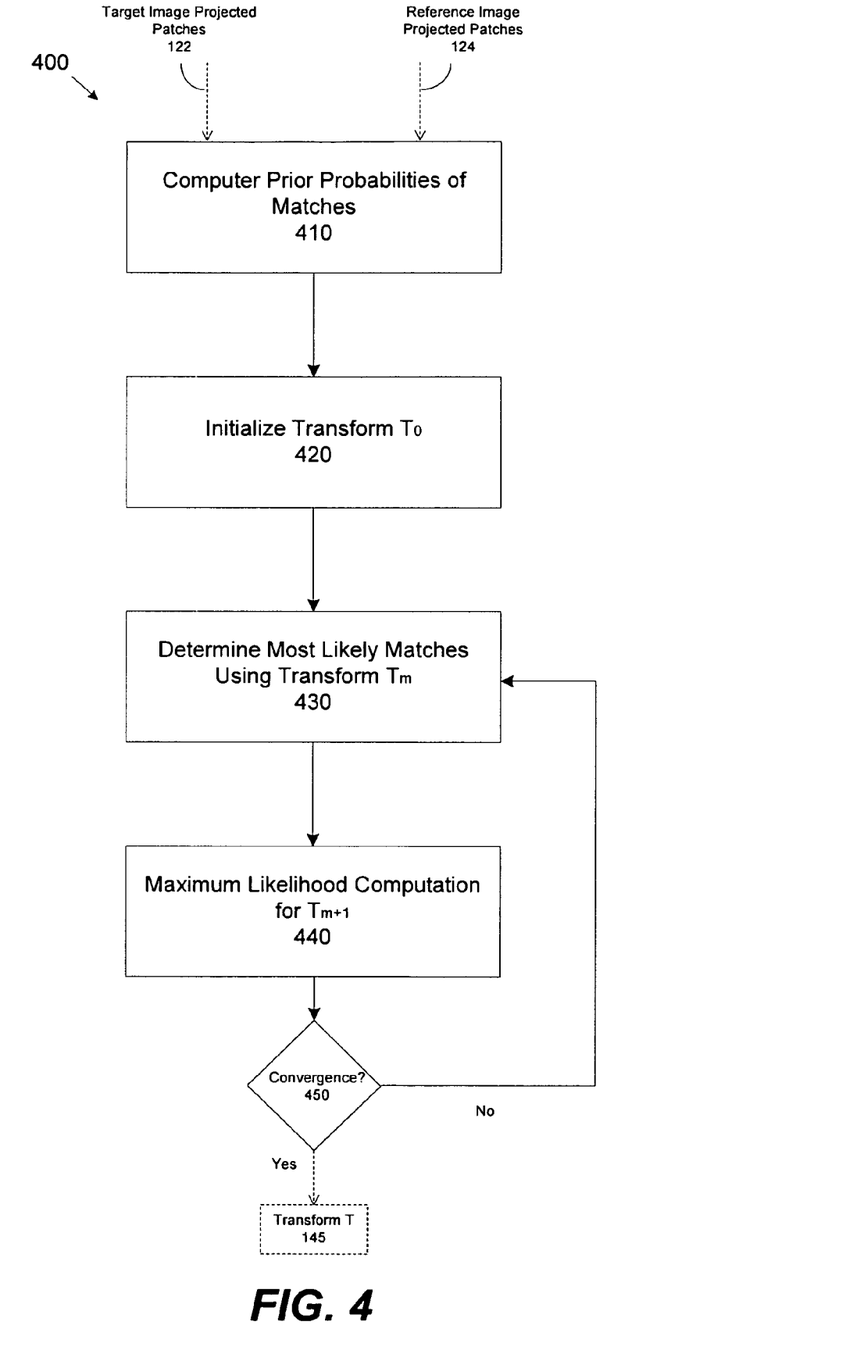

FIG. 4 is a flow chart illustrating an alternate method of feature correspondence search and transform determination for image registration, in accordance with some embodiments of the present invention. Method 400 may be used, for example, in connection with a set of patches extracted from two images which may, in some embodiments, comprise the set of target image projected patches 122 and the set of reference image projected patches 124 resulting from the projection into lower dimensional space of the target image patches 112 and the reference image patches 114, respectively, as obtained in act 120. Method 400 may be performed to combine the steps of correspondence search and transform determination such that the feature correspondences between the target and reference images and the transform to bring those correspondences into alignment may be estimated and optimized in a simultaneous iterative process.

In some embodiments according to the present invention, an expectation maximization iterative closest point (EM-ICP) procedure may be used to simultaneously optimize for correspondences and the registration transform. In this approach, the set of target image projected patches X may be represented by their center coordinates $x_i$, and the set of reference image projected patches Y may be represented by their center coordinates $y_i$. $T_m$ represents the current estimation of the transform between the target and the reference at iteration m.

Method 400 may begin with the determination of the prior probabilities of all possible pairwise matches between any target patch $x_i$ and any reference patch $y_j$ in act 410. According to conventional EM-ICP techniques, the prior probabilities are assumed to be based on the uniform law:

$$\pi_{ij} = \frac{1}{n}$$

In other embodiments, the EM-ICP approach may be extended to an EM-ICP-NC approach, by calculating prior probabilities based on the NC similarity measure between target and reference patches:

$$\overline{\pi_{ij}} = \frac{NC(p_i, p_j)}{\sum_k NC(p_i, p_k)}$$

Applicant has recognized that extension of the prior to account for the NC similarity between patches rather than simply points may provide enhanced accuracy in the estimation of feature correspondences and registration transforms.

In act 420, an initial transform $T_0$ is selected to begin the EM-ICP/EM-ICP-NC optimization process. The transform initialization may be selected according to any number of criteria appropriate to the application. In some embodiments, the NC prior computed in act 410 may also be used in the determination of the initial transform $T_0$. The transform estimation is updated during each EM iteration, with the current transform estimation at iteration m denoted as $T_m$.

In act 430 (the E step), the most likely patch matches between the target and reference may be determined under the current transform estimation $T_m$, considering the unknown correspondences as hidden random variables A. In some embodiments, the probability of correspondence between a target patch $x_i$ and a reference patch $y_j$ may be modeled by a Gaussian probability distribution assuming homogeneous isotropic Gaussian noise:

$$p(x_i|y_j) = \exp(-\|T_m * x_i - y_j\|^2 / 2\sigma^2)$$

where $\sigma$ represents the noise in the measurement. In the E step, T is fixed and the probabilities of the matches (A) are estimated:

$$p(A \mid X, Y, T_m) = \prod_{ij} \left( \frac{\pi_{ij} p(x_i \mid y_j, T_m)}{\sum_k \pi_{ik} p(x_i \mid y_k, T_m)} \right)^{A_{ij}}$$

$E(A_{ij})$ may then be computed as:

$$\overline{(A_{T_m})_{ij}} = \frac{\pi_{ij} \exp(-\|T_m * x_i - y_j\|^2 / 2\sigma^2)}{\sum_k \pi_{ik} \exp(-\|T_m * x_i - y_k\|^2 / 2\sigma^2)}$$

In act 440 (the M step), A is fixed and the likelihood is optimized with respect to T:

$$T_{m+1} = \underset{T_m}{\mathrm{argmax}}(E_A[\log P(X, A \mid Y, T_m)])$$

In act 450, the EM procedure may be iterated until convergence of the two EM steps (or until an acceptable level of convergence has be attained). Once satisfactory convergence is reached, the current transform estimation may be output as the optimum transform T 145 indicating the registration of the target image and the reference image.

Figure 5:
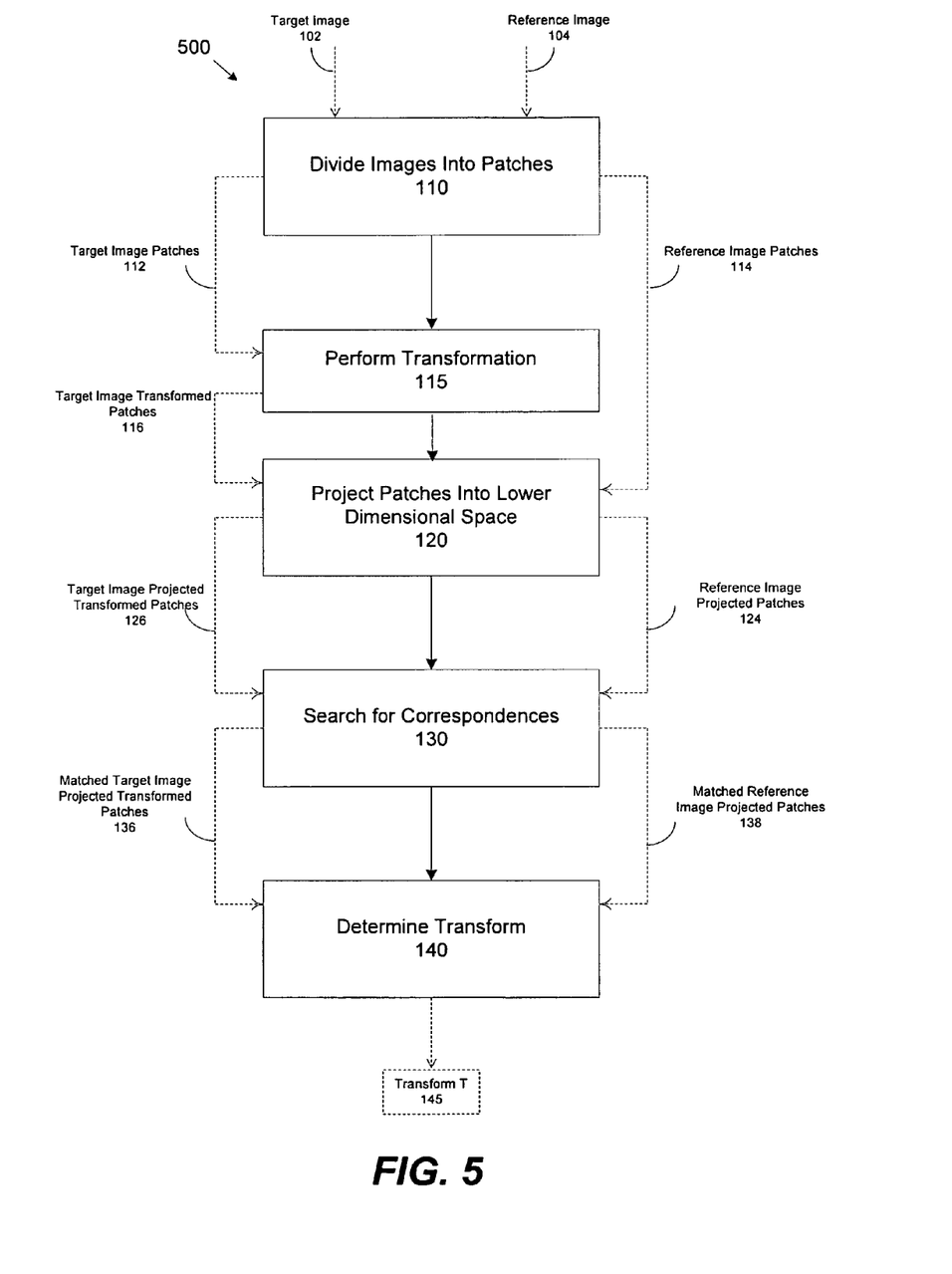

FIG. 5 is a flow chart illustrating an alternate method of image registration accounting for various forms of transformation between target and reference images, in accordance with some embodiments of the present invention. The transformation used may include, but is not limited to, rotations, scaling, shearing, etc. Method 500 may be used, for example, in connection with a target image 102 and a reference image 104 that are desired to be aligned for use in an imaging application. Method 500 may be performed to extend the acts of method 100 to incorporate enhanced robustness to continuous or piecewise rotations of target image 102 as compared to reference image 104.

In act 110, target image 102 and reference image 104 may be divided into a plurality of patches, as described above in reference to FIG. 1. In some embodiments according to the present invention, the resulting target image patches 112 may be transformed (e.g., rotated by a discrete number of angles) in act 115 prior to projection into a lower dimensional space. The transformation(s) may be selected according to any number of criteria appropriate to the application and/or the expected spatial relationship between the target and reference images. The resulting target image transformed patches 116 may comprise the original target image patches 112 along with one or more sets of target image patches that have been transformed as desired (e.g., rotated by various selected angles, scaled according to various scaling factors and/or distorted according to one or more shear factors).

In act 120, the target image transformed patches 116 and the reference image patches 114 may be reduced in dimension through random projections, as described above in reference to FIGS. 1 and 2. A search for feature correspondences, as described above in reference to FIGS. 1 and 3, may then be performed in act 130 to compare all of the target image projected transformed patches 126 against the reference image projected patches 124. That is, similarity measures may be computed for all pair-wise comparisons between each target image projected patch and each reference image projected patch, for all selected transformations of the target image projected patches.

Target image projected transformed patches 126 may then be matched to reference image projected patches 124 in such a way as to maximize the total similarity measure computed over all of the resulting patch matches. In some embodiments, a single transformation may be selected to maximize the total similarity measure, such that the resulting matched target image projected transformed patches $t_j$ 136 comprise only patches representing the entire target image transformed by a single transformation (e.g., rotated by a single angle, scaled by a single scale and/or deformed according to a single shear value). The transformation may be selected to provide the best correspondence between the transformed target image and the reference image. In other embodiments, the selected transformation for each patch may not be constrained, such that the resulting matched target image projected transformed patches $t_j$ 136 may comprise a transformed patch representing a different transformation for each target image patch. Selection of different transformations for each matched patch pair may allow for more accurate alignment of target images representing more severe distortions from the reference image.

In act 140, the matched target image projected transformed patches $t_j$ 136 and the matched reference image projected patches $r_j$ 138 may be used in the determination of transform T 145, as described above in reference to FIGS. 1 and 3. In other embodiments according to the present invention, the search for feature correspondences and the transform determination in method 500 may be combined in an iterative simultaneous optimization procedure, as described above in reference to FIG. 4. In such embodiments, the likelihood calculations used to optimize the patch matches and the registration transform may consider all selected transformations of the target image patches in determining the closest correspondences.

Figure 6:
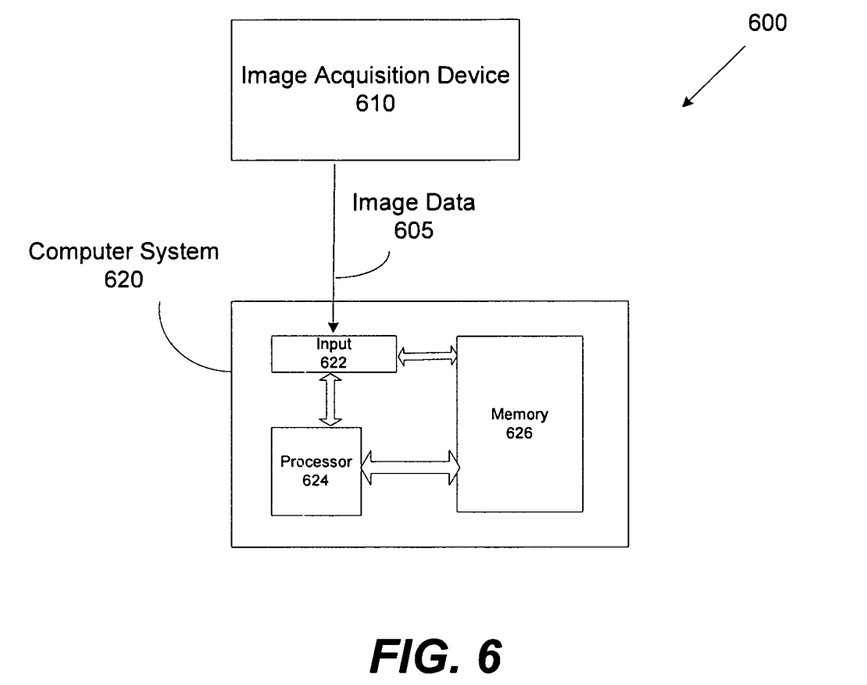

FIG. 6 is a block diagram illustrating one embodiment of a system 600 suitable for practicing various aspects of the present invention. System 600 may comprise an image acquisition device 610 and a computer system 620. Image acquisition device 610 may be any device capable of acquiring image data of a subject of interest, such as an object, structure, scene, or the like. Any image acquisition device providing image data may be suitable, as aspects of the invention are not limited to image data obtained from any particular type, arrangement and/or capability of device. For example, image acquisition device may be a device adapted to acquire images according to electron microscopy (EM), x-ray computed tomography (CT), magnetic resonance (MR), single photon emission computed tomography (SPECT), positron emission tomography (PET), computed radiography (CR), etc.

Computer system 620 may comprise an input 622 coupled to one or more processors 624 and/or one or more memory devices comprising memory 626. Input 622 may be any component or combination of components capable of receiving image data 605 from an image acquisition device or any media capable of storing and/or transmitting image data. Input 622 may also comprise components capable of converting image data 605 into a format suitable for image registration.

Memory 626 may comprise any type of tangible, non-transitory computer readable storage medium or storage device capable of storing data, instructions, etc, may include RAM, disk storage, and/or any other storage medium, examples of which are provided below, and may be implemented in any number of ways. Memory 626 may encoded with instructions, for example, as part of one or more programs that, as a result of being executed by processor 624, instruct the computer to perform one or more of the methods or functions described herein, and/or various embodiments, variations and/or combinations thereof. Memory 626 may also store image data received by input 622 or otherwise stored in computer system 620.

Computer system 620 may be, for example, a personal computer (PC), work station, general purpose computer, or any other computing device. Computer system 620 may be integrated into image acquisition device 610 or may be a separate stand-alone system, either proximate or remote from image acquisition device 610. For example, computer system 620 may be connected to image acquisition device 610 over a network, connected to multiple image acquisition devices, or may not be connected to any image acquisition device at all. In this last respect, computer system 620 may operate on image data previously stored in memory 626, or may obtain the image data from some other location, e.g., another computer system, over a network, via transportable storage medium, etc. It should be appreciated that any computing environment may be used, as the aspects of the invention described herein are not limited to use with a computer system of any particular type or implementation.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a tangible, non-transitory computer readable storage medium (or multiple such computer readable storage media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A computer-implemented method of registering a first image and a second image, the method comprising computer-implemented acts of:
   logically dividing the first image into a first plurality of regions;
   logically dividing the second image into a second plurality of regions;
   projecting the first plurality of regions and the second plurality of regions into a lower dimensional space using random projections;
   determining, for each of the projected first plurality of regions, at least one of the projected second plurality of regions that is closest according to first criteria; and
   determining a transform that brings each of the projected first plurality of regions into a closest correspondence with the respective at least one of the projected second plurality of regions according to second criteria, the transform indicating the registration of the first image and the second image.

2. The method of claim 1, wherein the lower dimensional space has a dimensionality k, wherein k=O(log n), wherein n is a number of data points of a region of the first or second plurality of regions.

3. The method of claim 2, wherein $k = O(\epsilon^{-2} \log n)$, and wherein the projecting expands or contracts pairwise distances between data points in a region of the first or second plurality of regions by a factor of at most $1+\epsilon$.

4. The method of claim 1, wherein the projecting comprises applying a projection matrix of random variables taking values of 1, 0 or −1.

5. The method of claim 1, wherein the first criteria are based at least in part on an approximate nearest neighbor formulation.

6. The method of claim 1, wherein the determining acts are performed using an expectation maximization iterative closest point procedure.

7. The method of claim 1, further comprising transforming at least one of the first plurality of regions prior to projecting the first plurality of regions into the lower dimensional space.

8. At least one non-transitory computer readable medium encoded with instructions that, when executed by at least one processor, perform a method of registering a first image and a second image, the method comprising:
   logically dividing the first image into a first plurality of regions;
   logically dividing the second image into a second plurality of regions;
   projecting the first plurality of regions and the second plurality of regions into a lower dimensional space using random projections;
   determining, for each of the projected first plurality of regions, at least one of the projected second plurality of regions that is closest according to first criteria; and
   determining a transform that brings each of the projected first plurality of regions into a closest correspondence with the respective at least one of the projected second plurality of regions according to second criteria, the transform indicating the registration of the first image and the second image.

9. The at least one non-transitory computer readable medium of claim 8, wherein the lower dimensional space has a dimensionality k, wherein k=O(log n), wherein n is a number of data points of a region of the first or second plurality of regions.

10. The at least one non-transitory computer readable medium of claim 9, wherein $k = O(\epsilon^{-2} \log n)$, and wherein the projecting expands or contracts pairwise distances between data points in a region of the first or second plurality of regions by a factor of at most $1 + \epsilon$.

11. The at least one non-transitory computer readable medium of claim 8, wherein the projecting comprises applying a projection matrix of random variables taking values of 1, 0 or −1.

12. The at least one non-transitory computer readable medium of claim 8, wherein the first criteria are based at least in part on an approximate nearest neighbor formulation.

13. The at least one non-transitory computer readable medium of claim 8, wherein the determining acts are performed using an expectation maximization iterative closest point procedure.

14. The at least one non-transitory computer readable medium of claim 8, wherein the method further comprises transforming at least one of the first plurality of regions prior to projecting the first plurality of regions into the lower dimensional space.

15. A system for registering a first image and a second image, the system comprising:
   an input to receive the first image and the second image; and
   at least one processor coupled to the input, the at least one processor programmed to perform a method comprising:
      logically dividing the first image into a first plurality of regions;
      logically dividing the second image into a second plurality of regions;
      projecting the first plurality of regions and the second plurality of regions into a lower dimensional space using random projections;
      determining, for each of the projected first plurality of regions, at least one of the projected second plurality of regions that is closest according to first criteria; and
      determining a transform that brings each of the projected first plurality of regions into a closest correspondence with the respective at least one of the projected second plurality of regions according to second criteria, the transform indicating the registration of the first image and the second image.

16. The system of claim 15, wherein the lower dimensional space has a dimensionality k, wherein k=O(log n), wherein n is a number of data points of a region of the first or second plurality of regions.

17. The system of claim 16, wherein $k = O(\epsilon^{-2} \log n)$, and wherein the projecting expands or contracts pairwise distances between data points in a region of the first or second plurality of regions by a factor of at most $1+\epsilon$.

18. The system of claim 15 wherein the first criteria are based at least in part on an approximate nearest neighbor formulation.

19. The system of claim 15, wherein the determining acts are performed using an expectation maximization iterative closest point procedure.

20. The system of claim 15, wherein the method further comprises transforming at least one of the first plurality of regions prior to projecting the first plurality of regions into the lower dimensional space.

* * * * *